(12) United States Patent
Aggarwal et al.

(10) Patent No.: US 9,921,901 B2
(45) Date of Patent: *Mar. 20, 2018

(54) ALERTING SERVICE DESK USERS OF BUSINESS SERVICES OUTAGES

(71) Applicant: International Business Machines Corporation, Armonk, NY (US)

(72) Inventors: Vijay K. Aggarwal, Austin, TX (US); Scott S. Dickerson, Austin, TX (US); Edward D. Whitehead, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 225 days.

This patent is subject to a terminal disclaimer.

(21) Appl. No.: 14/822,501

(22) Filed: Aug. 10, 2015

(65) Prior Publication Data

US 2015/0347219 A1 Dec. 3, 2015

Related U.S. Application Data

(63) Continuation of application No. 14/104,030, filed on Dec. 12, 2013.

(51) Int. Cl.
| | |
|---|---|
| *G06F 11/00* | (2006.01) |
| *G06F 11/07* | (2006.01) |
| *H04L 12/24* | (2006.01) |
| *H04L 29/08* | (2006.01) |
| *H04L 29/14* | (2006.01) |

(52) U.S. Cl.
CPC ...... *G06F 11/0769* (2013.01); *G06F 11/0721* (2013.01); *H04L 41/0604* (2013.01); *H04L 41/069* (2013.01); *H04L 41/22* (2013.01); *H04L 41/507* (2013.01); *H04L 67/22* (2013.01); *H04L 67/306* (2013.01); *H04L 69/40* (2013.01)

(58) Field of Classification Search
CPC . H04L 43/0805; H04L 43/0823; H04L 69/40; H04N 21/4425
See application file for complete search history.

(56) References Cited

U.S. PATENT DOCUMENTS

| | | | |
|---|---|---|---|
| 6,259,972 B1 | 7/2001 | Sumic et al. | |
| 8,775,859 B2 | 7/2014 | Li et al. | |
| 2003/0056140 A1 | 3/2003 | Taylor et al. | |
| 2008/0091454 A1 | 4/2008 | Fisher | |
| 2009/0092054 A1* | 4/2009 | Compton | H04L 41/069 |
| | | | 370/242 |

(Continued)

OTHER PUBLICATIONS

Office Action for U.S. Appl. No. 14/104,030, U.S. Patent and Trademark Office, dated Feb. 12, 2016, 13 pages.

(Continued)

*Primary Examiner* — Esther B Henderson
(74) *Attorney, Agent, or Firm* — VanLeeuwen & VanLeeuwen; Richard A. Wilhelm

(57) ABSTRACT

An approach is provided in a service desk detects a current computer resource outage and identifies applications corresponding to the computer resource outage. The service desk uses historical service request entries to match the identified applications to users previously inquiring about the applications and, in turn, sends notifications to the users regarding the computer resource outage.

6 Claims, 7 Drawing Sheets

(56) References Cited

U.S. PATENT DOCUMENTS

2009/0276283 A1 11/2009 Sunday et al.
2014/0081998 A1 3/2014 Fan et al.

OTHER PUBLICATIONS

IBM, "System and Method for Real Time Outage Alerts," IP.com, IPCOM000161955D, Dec. 12, 2007, 4 pages.
Final Office Action for U.S. Appl. No. 14/104,030, U.S. Patent and Trademark Office, date Jun. 16, 2016, 10 pages.
Office Action for U.S. Appl. No. 14/104,030, U.S. Patent and Trademark Office, dated Feb. 9, 2017, 9 pages.

* cited by examiner

ALERTING SERVICE DESK USERS OF BUSINESS SERVICES OUTAGES

BACKGROUND

Company employees use common Information Technology (I/T) computer resources such as e-mail, instant messaging and e-meetings to perform job functions. When these computer resources become unavailable, either from planned outages or from unplanned outages, employees unknowingly spend time attempting to access the computer resources during the outages.

A service desk provides a mechanism for a user to enter a service request when the user experiences a computer resource issue, such as not being able to access a particular application. Service desks typically employ an issue tracking system to create, update, and resolve reported customer issues. The issue tracking system often includes a knowledge base that includes resolutions to common problems. Businesses have moved towards "self-service" web-based service desks, which allow a user to view known issues in a computer environment and enter service requests if needed when a user experiences computer resource issues. Service desks, however, may overwhelm a user with outage notifications corresponding to computer resources unrelated to the user's work environment. For example, an engineer may be notified of a finance server outage that the engineer does not have a requirement, or permission, to access.

BRIEF SUMMARY

According to one embodiment of the present disclosure, an approach is provided in which a service desk detects a current computer resource outage and identifies applications corresponding to the computer resource outage. The service desk uses historical service request entries to match the identified applications to users previously inquiring about the applications and, in turn, sends notifications to the users regarding the computer resource outage.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
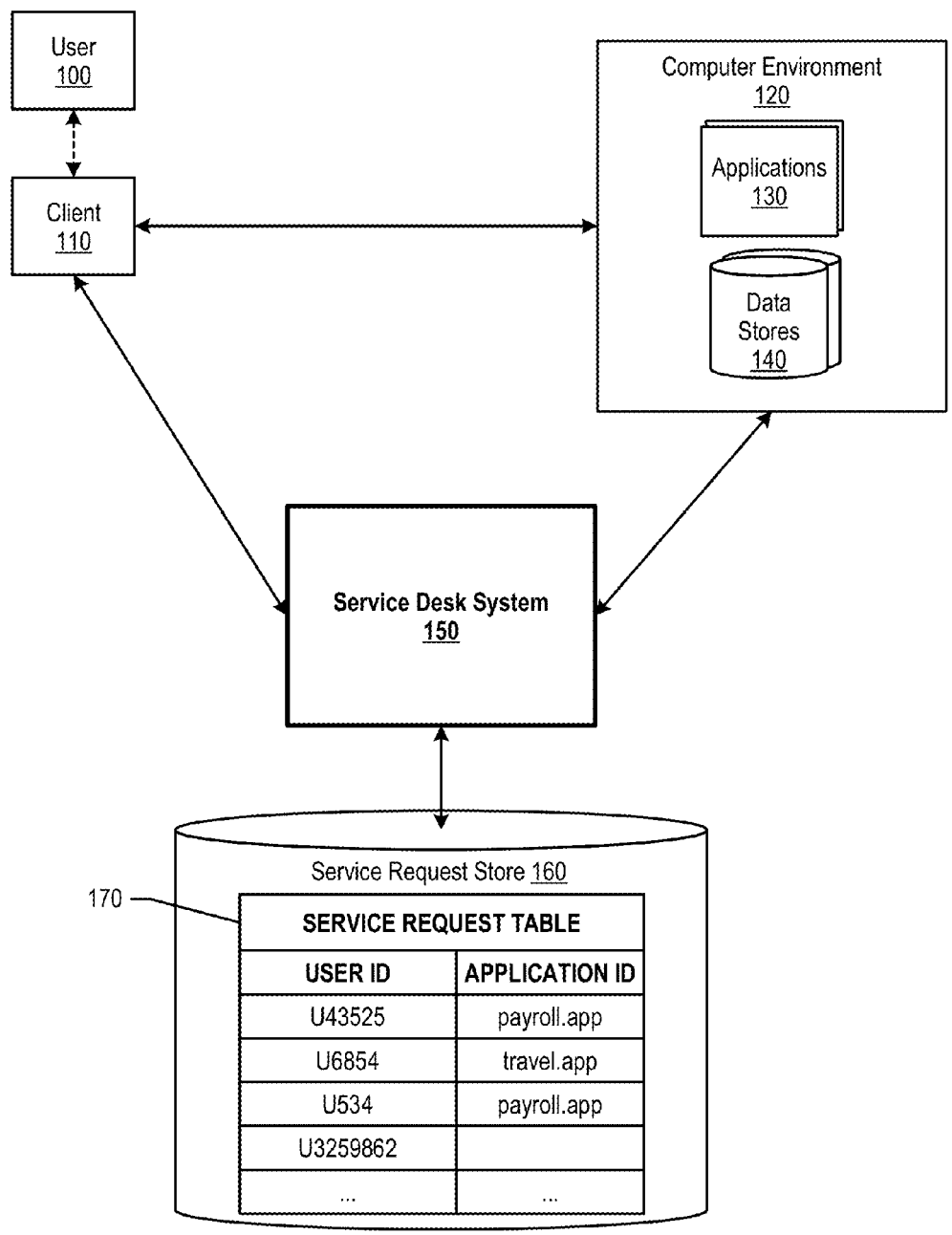
FIG. 1 is a diagram showing one embodiment of a service desk system informing a user of resource outages.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following detailed description will generally follow the summary of the disclosure, as set forth above, further explaining and expanding the definitions of the various aspects and embodiments of the disclosure as necessary.

FIG. 1 is a diagram showing one embodiment of a service desk system informing a user of resource outages. Service desk system 150 manages service requests received from users pertaining to computer resource issues within computer environment 120. When service desk system 150 receives a new service request, service request system 150 generates a service request entry that includes a user identifier (ID) and an application identifier. The user identifier corresponds the user that submitted the service request and the application identifier corresponds to the user's computer resource issue. In one embodiment, the application identifier may be identified from information included in the service request, such as through error code analysis or textual analysis of a problem description (see FIG. 4 and corresponding text for further details).

Service desk system 150 keeps a log of the service request entries in service request table 170 (stored in service request store 160), even after the service request is resolved, to establish historical associations between users and the applications they utilize. In turn, service desk system 150 proactively notifies users associated with an application affected by a new computer resource outage as discussed below.

User 100 logs on to client 110 and attempts to access a particular resource (e.g., one of applications 130 or one of data stores 140). User 100 is not able to access a computer resource for various reasons, such as from the application and/or database being down for planned/unplanned maintenance. As such, user 100 accesses service desk system 150 to view resource outage information and enter a service request if needed. Service desk system 150 receives login information from client 110 and accesses service request table 170 to identify applications associated with user 100 (from prior "historical service requests"). Service desk system 150 determines whether the associated applications are experiencing a computer resource outage and, if so, displays an outage notification on user 100's service desk home screen (see FIG. 2 and corresponding text for further details). As a result, user 100 is informed of outage notifications pertaining to user 100's utilized applications. If user 100 is experiencing a computer resource issue unrelated to the displayed outage notifications, user 100 enters a new service request to service desk system 150.

In one embodiment, when service desk system 150 is informed of a computer resource outage, such as from an administrator and/or a new service request, service desk system 150 identifies affected applications and accesses service request table to identify users associated with the affected applications. In this embodiment, service desk system 150 notifies the users accordingly, such as by sending a message (e.g., email) to the users and/or, by displaying a resource outage notice on the user's service desk home screen (see FIG. 5 and corresponding text for further details).

Figure 2:
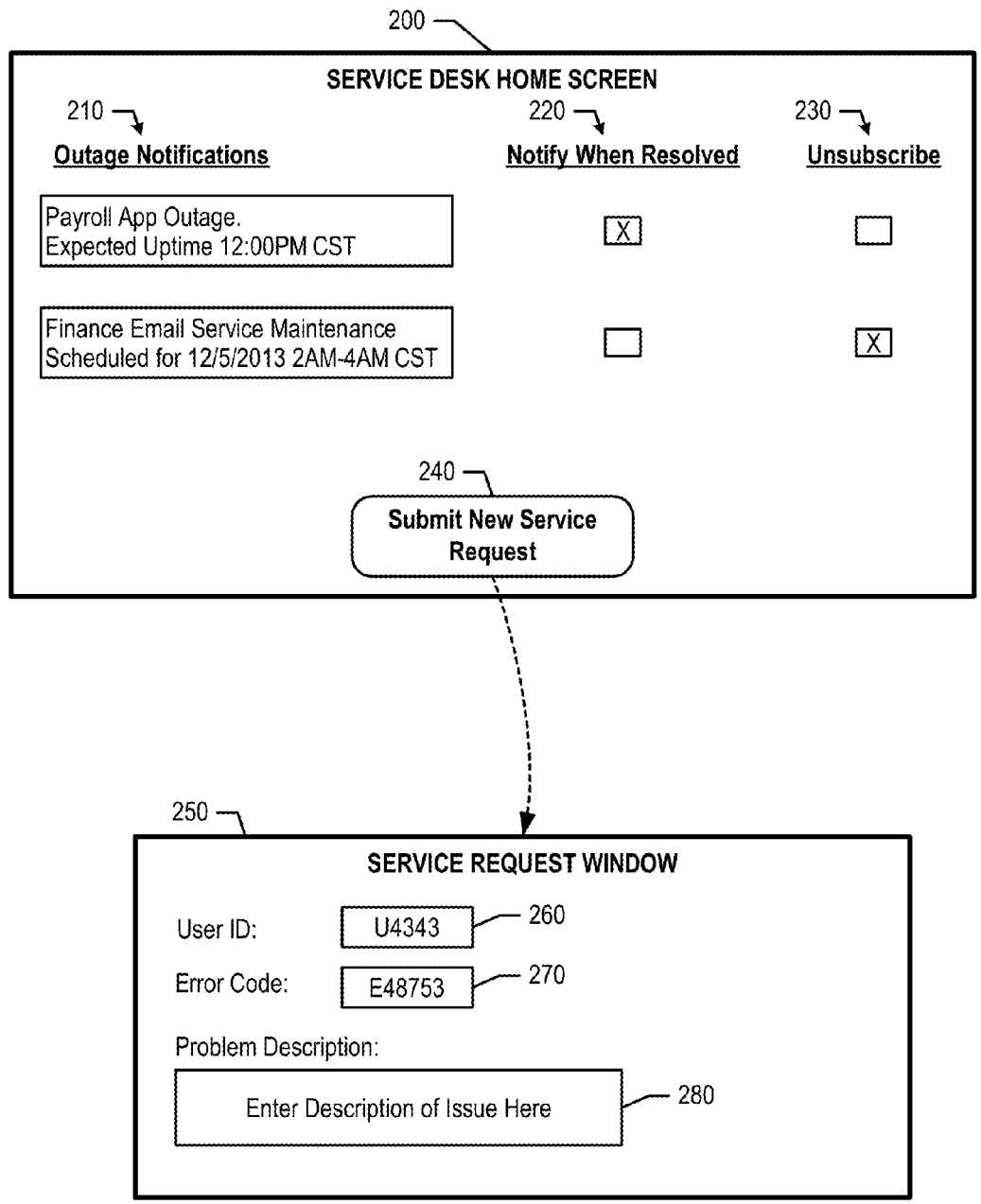
FIG. 2 is a diagram showing one embodiment of a service desk home screen presented to a user by a service desk system.

FIG. 2 is a diagram showing one embodiment of a service desk home screen presented to a user by service desk system 150. Window 200 may be displayed by client 110 to user 100 when user 100 logs in to service desk system 150. Window 200 shows personalized current computer resource outage notifications (210) pertaining to applications associated with user 100 based upon historical service requests submitted by user 100. As such, user 100 may view window 200 to determine whether to submit a new service request that describes a new computer resource issue currently being experienced by user 100.

Window 200 allows the user to select to be notified when a current computer resource issue is resolved (220), and also allows the user to unsubscribe from receiving current computer resource outage information pertaining to a particular application (230). If user 100 wishes to submit a new service request (e.g., the current computer resource outages are unrelated to user 100's problem), user 100 selects button 240, which causes client 110 to display window 250.

User 100 enters service request information in window 250, which includes entering the user's ID in box 260. In one embodiment, the user ID is automatically entered based upon the user's login information. If user 100's issue involves an error code (e.g., an application displays an error number), the user enters such error code in box 270. Box 280 includes an area for the user to describe the user's problem, such as "I'm having trouble with the payroll application." In turn, service desk system 150 performs textual analysis on the problem description to determine the particular application corresponding to the computer resource issue (see FIG. 4 and corresponding text for further details).

Figure 3:
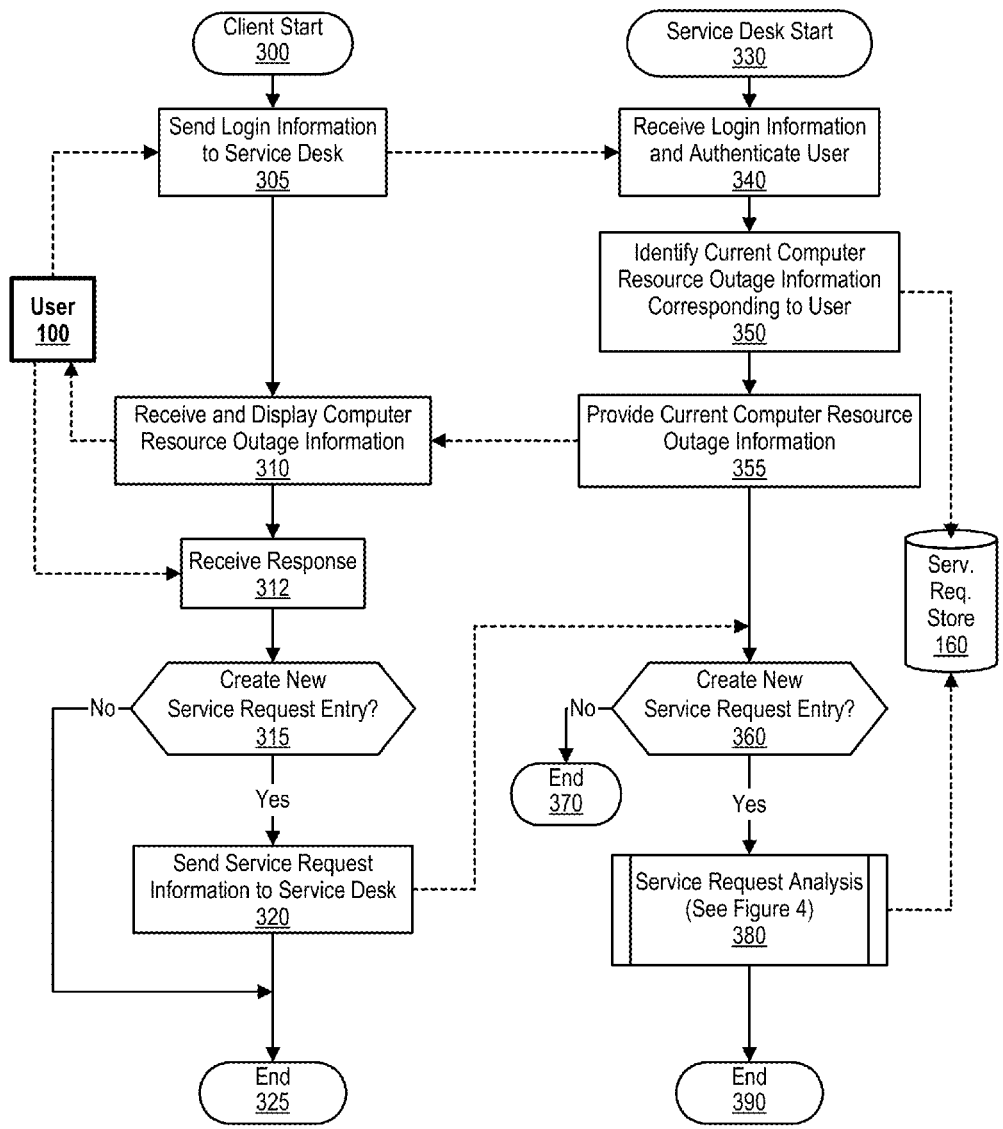
FIG. 3 is a flowchart showing one embodiment of steps taken in providing resource outage notifications to a user and creating a new service request entry.

FIG. 3 is a flowchart showing one embodiment of steps taken in providing resource outage notifications to a user and creating a new service request entry. Client processing commences at 300, whereupon the client sends login information received from user 100 to the service desk (305). Service desk processing commences at 330, whereupon the service desk receives the login information and authenticates the user (340). The service desk retrieves current computer resource outage information corresponding to the user from service request store 160 at 350. For example, user 100 may have generated service request entries in the past that correspond to a payroll application and an email application. In this example, the service desk retrieves current computer resource outage information corresponding to the payroll application or email application (e.g., a server, a storage device, application updates, etc.). At 355, the service desk provides the current computer resource outage notifications to the client.

The client receives the current computer resource outage notifications from the service desk and displays the information to user 100 at 310 (e.g., via window 200 shown in FIG. 2). At 312, the client receives a response from user 100, such as closing window 200 or selecting button 240 shown in FIG. 2. A determination is made as to whether user 100 wishes to create a new service request entry after reviewing the current outage information (decision 315).

If the user does not wish to create a new service request entry, such as because one of the displayed outage notifications pertained to user 100's computer resource issue, decision 315 branches to the "No" branch, whereupon processing ends at 325. On the other hand, if the user wishes to create a new service request entry, decision 315 branches to the "Yes" branch, whereupon the client sends service request information provided by user 100 (via window 250 shown in FIG. 2) to the service desk (320) and client processing ends at 325.

Referring back to the service desk, if the user does not wish to create a new service request entry, decision 360 branches to the "No" branch, whereupon service desk processing ends at 370. On the other and, if the user wishes to create a new service desk entry, decision 360 branches to the "Yes" branch, whereupon the service desk analyzes the service request and generates a new service request entry based upon information received from the client and/or textual analysis of user 100's problem description (predefined process block 380, see FIG. 4 and corresponding text for further details). Service desk processing ends at 390.

Figure 4:
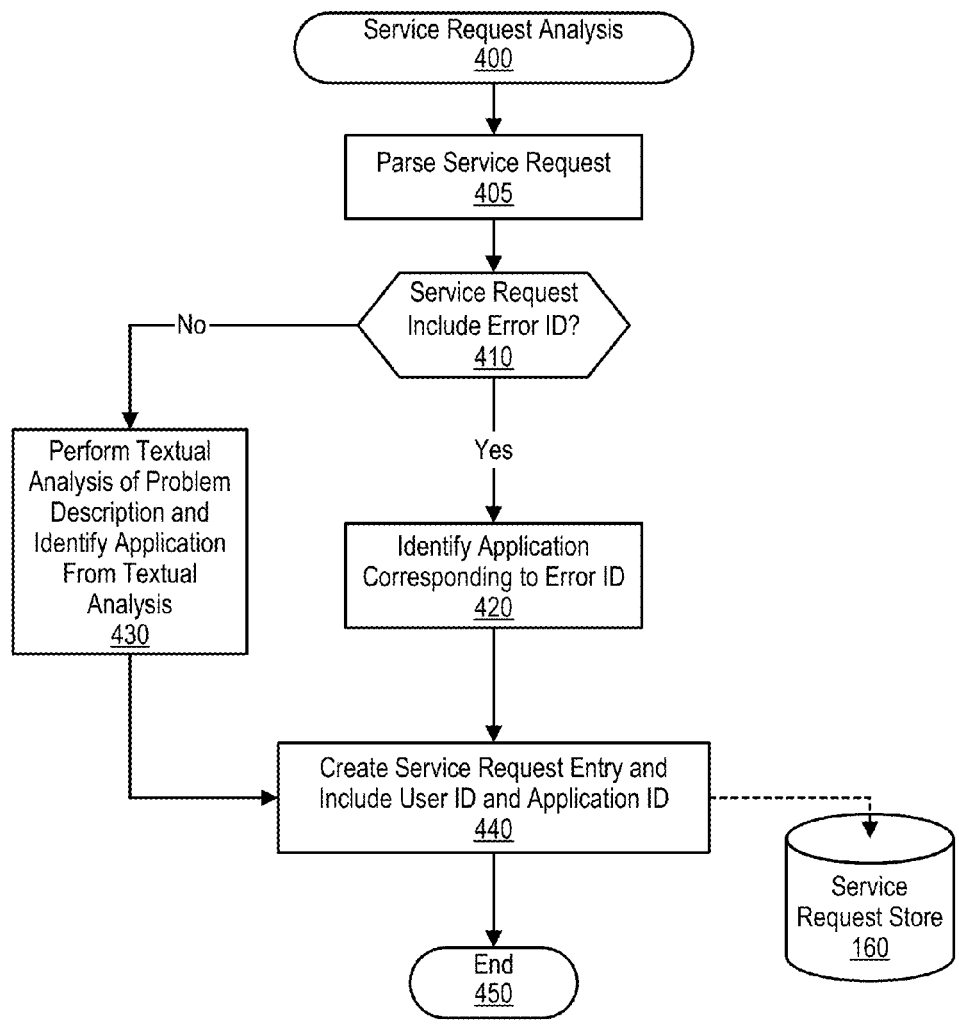
FIG. 4 is a flowchart showing one embodiment of steps taken to analyze a service request and generate a new service request entry.

FIG. 4 is a flowchart showing one embodiment of steps taken to analyze a service request and generate a new service request entry. Service desk processing commences at 400, whereupon the service desk parses the service request information received from the user's client (405). A determination is made as to whether the user provided an error code in the service request, such as from an error code displayed on the user's display (decision 410). If the service request includes an error code, decision 410 branches to the "Yes" branch, whereupon the service desk identifies an application and application ID corresponding to the code, such as through a look up table included in the service desk (420). At 440, the service desk creates a service request entry in service request store 160 that includes the user ID (from the service request) and the identified application ID.

On the other hand, if the service request does not include an error code, decision 410 branches to the "No" branch, whereupon the service desk performs textual analysis of a problem description provided by the user (e.g., field 280 shown in FIG. 2) and identifies an application based upon the textual analysis (430). For example, the service desk may analyze text of "payroll not working" and, in turn, associate a payroll application with the service request. At 440, the service desk creates a service request entry in service request store 160 and includes the user ID (from the service request) and the application ID corresponding to the application identified at 430. Processing ends at 450.

Figure 5:
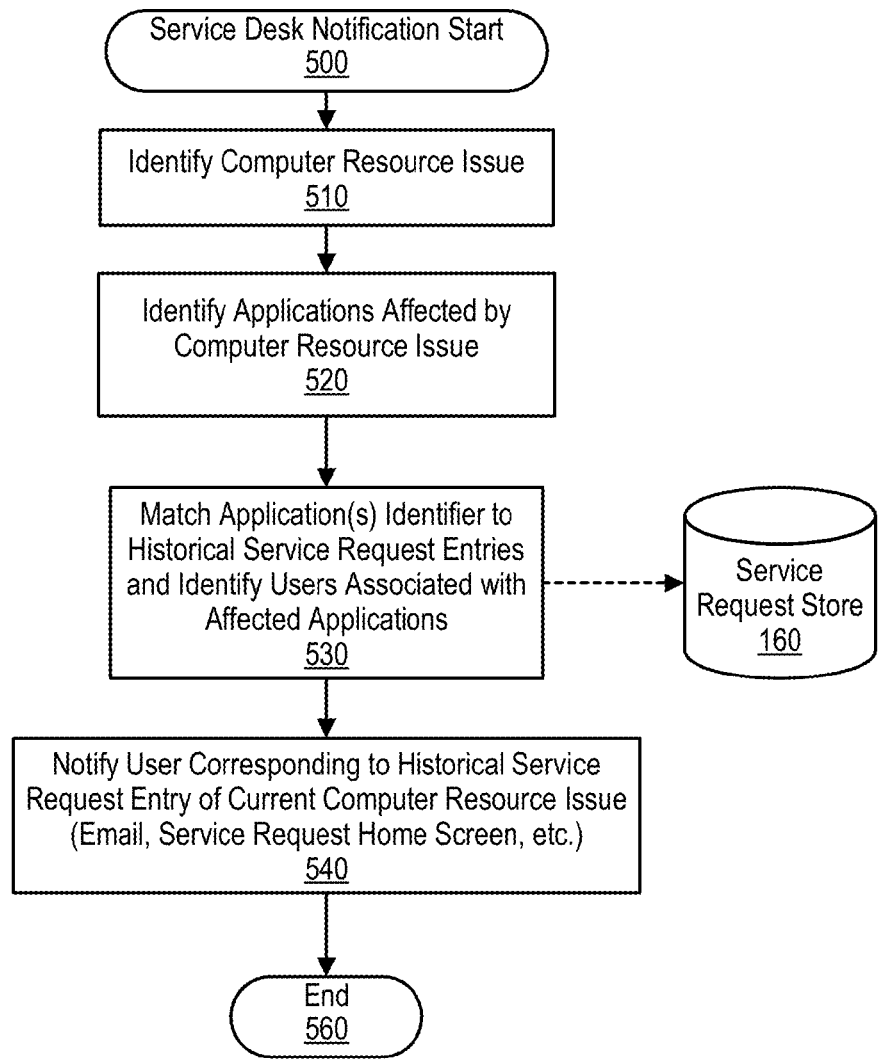
FIG. 5 is a flowchart showing one example of steps taken in using historical service request entries to notify users of current resource outages.

FIG. 5 is a flowchart showing one example of steps taken in using historical service request entries to notify users of current resource outages. Service desk processing commences at 500, whereupon the service desk identifies a computer resource issue (510). In one embodiment, the service desk identifies a computer resource issue based upon receiving a new service request from a user. In another embodiment, the service desk identifies a computer resource issue from information received from an administrator pertaining to a planned outage or an unplanned computer resource outage.

At 520, the service desk identifies applications affected by the computer resource issue. For example, a storage device may support a payroll application and an employee information application. At 530, the service desk locates historical service request entries in w store 160 (service request table 170) that match the affected applications and, in turn, identifies users associated with the affected applications. For example, the service desk may match historical service request entries to a payroll application and extract user identifiers from the matched historical service request entries.

At 540, the service desk notifies the users corresponding to the matched historical service request entries. In one embodiment, the user is notified of the computer resource outage based on user-specified parameters, such as by sending an email to the user and/or displaying an outage notification on the user's service desk home screen (e.g., window 200 shown in FIG. 2). Processing ends at 560.

Figure 6:
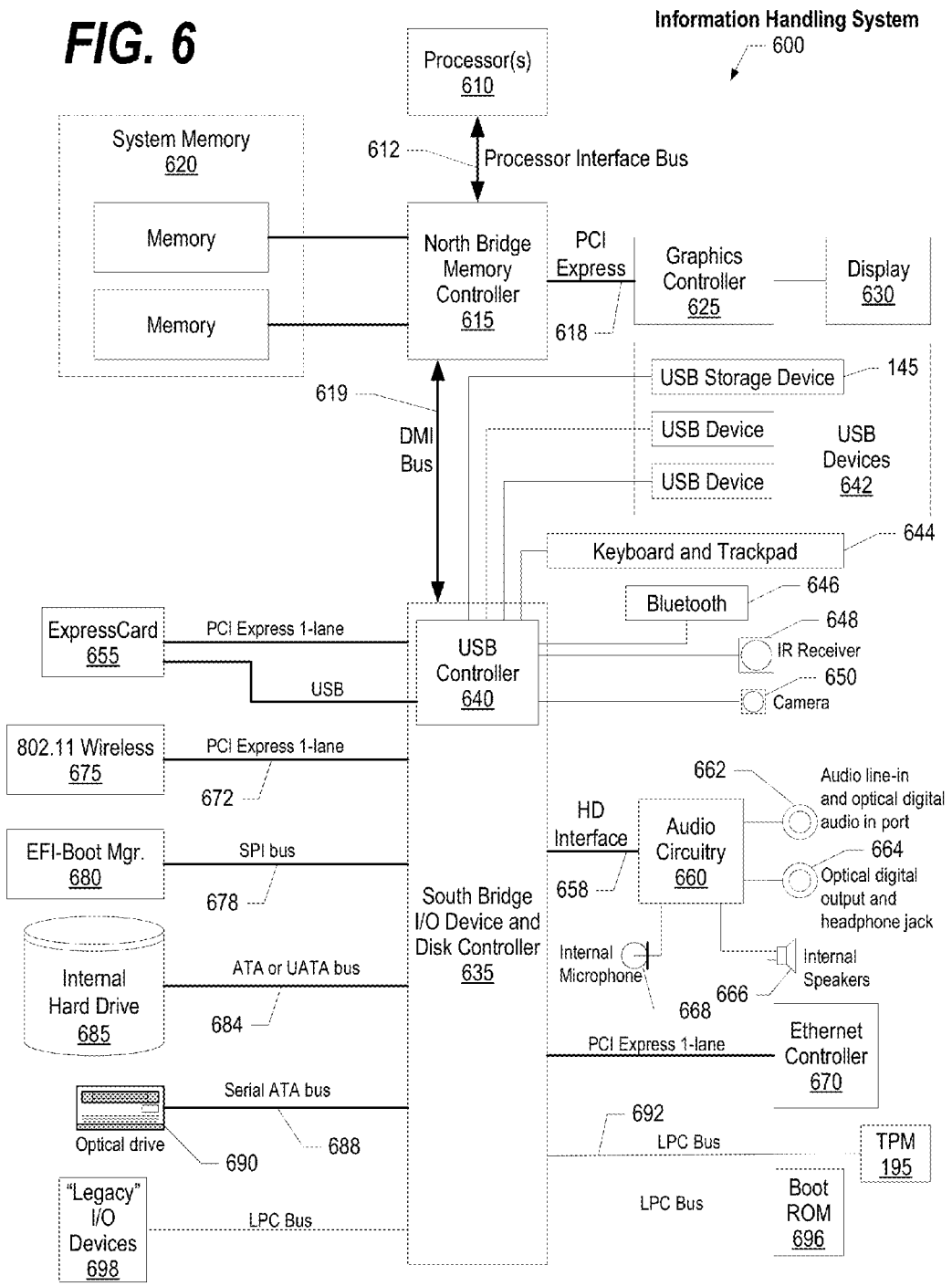
FIG. 6 is a block diagram of a data processing system in which the methods described herein can be implemented.

FIG. 6 illustrates information handling system 600, which is a simplified example of a computer system capable of performing the computing operations described herein. Information handling system 600 includes one or more processors 610 coupled to processor interface bus 612. Processor interface bus 612 connects processors 610 to Northbridge 615, which is also known as the Memory Controller Hub (MCH). Northbridge 615 connects to system memory 620 and provides a means for processor(s) 610 to access the system memory. Graphics controller 625 also connects to Northbridge 615. In one embodiment, PCI Express bus 618 connects Northbridge 615 to graphics controller 625. Graphics controller 625 connects to display device 630, such as a computer monitor.

Northbridge 615 and Southbridge 635 connect to each other using bus 619. In one embodiment, the bus is a Direct Media Interface (DMI) bus that transfers data at high speeds in each direction between Northbridge 615 and Southbridge 635. In another embodiment, a Peripheral Component Interconnect (PCI) bus connects the Northbridge and the Southbridge. Southbridge 635, also known as the I/O Controller Hub (ICH) is a chip that generally implements capabilities that operate at slower speeds than the capabilities provided by the Northbridge. Southbridge 635 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 696 and "legacy" I/O devices (using a "super I/O" chip). The "legacy" I/O devices (698) can include, for example, serial and parallel ports, keyboard, mouse, and/or a floppy disk controller. The LPC bus also connects Southbridge 635 to Trusted Platform Module (TPM) 695. Other components often included in Southbridge 635 include a Direct Memory Access (DMA) controller, a Programmable Interrupt Controller (PIC), and a storage device controller, which connects Southbridge 635 to nonvolatile storage device 685, such as a hard disk drive, using bus 684.

ExpressCard 655 is a slot that connects hot-pluggable devices to the information handling system. ExpressCard 655 supports both PCI Express and USB connectivity as it connects to Southbridge 635 using both the Universal Serial Bus (USB) the PCI Express bus. Southbridge 635 includes USB Controller 640 that provides USB connectivity to devices that connect to the USB. These devices include webcam (camera) 650, infrared (IR) receiver 648, keyboard and trackpad 644, and Bluetooth device 646, which provides for wireless personal area networks (PANs). USB Controller 640 also provides USB connectivity to other miscellaneous USB connected devices 642, such as a mouse, removable nonvolatile storage device 645, modems, network cards, ISDN connectors, fax, printers, USB hubs, and many other types of USB connected devices. While removable nonvolatile storage device 645 is shown as a USB-connected device, removable nonvolatile storage device 645 could be connected using a different interface, such as a Firewire interface, etcetera.

Wireless Local Area Network (LAN) device 675 connects to Southbridge 635 via the PCI or PCI Express bus 672. LAN device 675 typically implements one of the IEEE 802.11 standards of over-the-air modulation techniques that all use the same protocol to wireless communicate between information handling system 600 and another computer system or device. Optical storage device 690 connects to Southbridge 635 using Serial ATA (SATA) bus 688. Serial ATA adapters and devices communicate over a high-speed serial link. The Serial ATA bus also connects Southbridge 635 to other forms of storage devices, such as hard disk drives. Audio circuitry 660, such as a sound card, connects to Southbridge 635 via bus 658. Audio circuitry 660 also provides functionality such as audio line-in and optical digital audio in port 662, optical digital output and headphone jack 664, internal speakers 666, and internal microphone 668. Ethernet controller 670 connects to Southbridge 635 using a bus, such as the PCI or PCI Express bus. Ethernet controller 670 connects information handling system 600 to a computer network, such as a Local Area Network (LAN), the Internet, and other public and private computer networks.

While FIG. 6 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 695) shown in FIG. 6 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 7.

Figure 7:
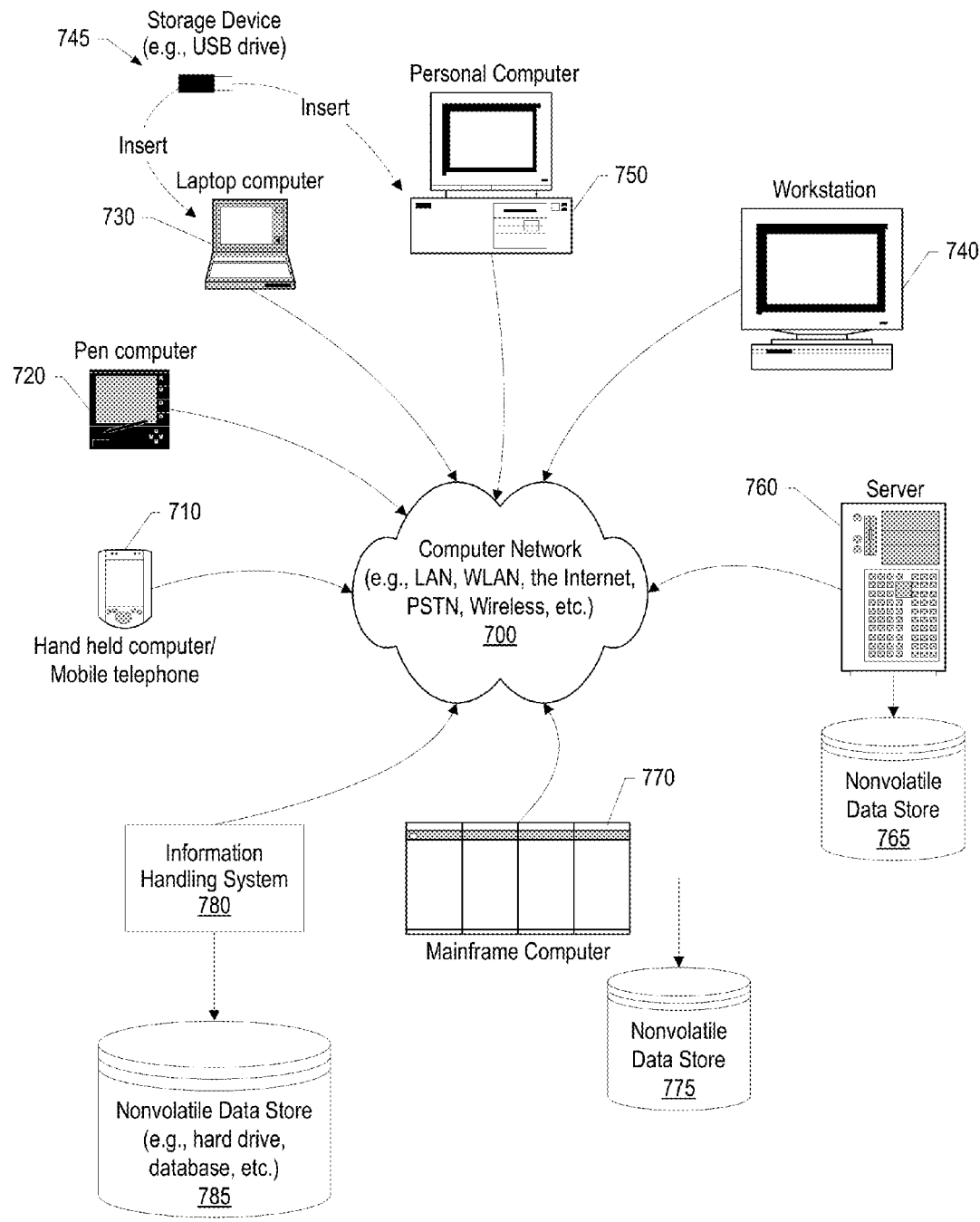
FIG. 7 provides an extension of the information handling system environment shown in FIG. 6 to illustrate that the methods described herein can be performed on a wide variety of information handling systems which operate in a networked environment.

FIG. 7 provides an extension of the information handling system environment shown in FIG. 6 to illustrate that the methods described herein can be performed on a wide variety of information handling systems that operate in a networked environment. Types of information handling systems range from small handheld devices, such as handheld computer/mobile telephone 710 to large mainframe systems, such as mainframe computer 770. Examples of handheld computer 710 include personal digital assistants (PDAs), personal entertainment devices, such as MP3 players, portable televisions, and compact disc players. Other examples of information handling systems include pen, or tablet, computer 720, laptop, or notebook, computer 730, workstation 740, personal computer system 750, and server 760. Other types of information handling systems that are not individually shown in FIG. 7 are represented by information handling system 780. As shown, the various information handling systems can be networked together using computer network 700. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 7 depicts separate nonvolatile data stores (server 760 utilizes nonvolatile data store 765, mainframe computer 770 utilizes nonvolatile data store 775, and information handling system 780 utilizes nonvolatile data store 785). The nonvolatile data store can be a component that is external to the various information handling systems or can be internal to one of the information handling systems. In addition, removable nonvolatile storage device 645 can be shared among two or more information handling systems using various techniques, such as connecting the removable nonvolatile storage device 645 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
receiving a service request from a first user that includes a problem description describing a first computer resource issue;
performing textual analysis on the problem description and identifying an application corresponding to the problem description based on one or more keywords identified during the textual analysis;
creating a service request entry that associates the first user to the application;
detecting a second computer resource issue corresponding to a second user that occurred subsequent to the creating of the service request entry, wherein the second user is different than the first user;
determining that the second computer resource issue corresponds to the application; and
notifying the first user about the second computer resource issue based on the service request entry that associates the first user to the application.

2. The method of claim 1 further comprising:
determining whether the service request includes an error code;
in response to determining that the service request includes an error code:
identifying the application corresponding to the error code; and
including a first application identifier corresponding to the application in the service request entry.

3. The method of claim 1 further comprising:
receiving a login request;
determining that the login request corresponds to the first user; and
displaying an outage notification to the first user on a user interface home screen in response to the determination.

4. The method of claim 3 further comprising:
receiving an un-subscribe request from the first user in response to displaying the outage notification; and
disassociating the first user from the outage notification.

5. The method of claim 3 further comprising:
receiving a resolution notification request from the first user in response to displaying the outage notification; and
notifying the first user when the computer resource issue is resolved in response to receiving the resolution notification request.

6. The method of claim 1 wherein the notifying includes sending a message to the first user.

* * * * *